UNITED STATES PATENT OFFICE.

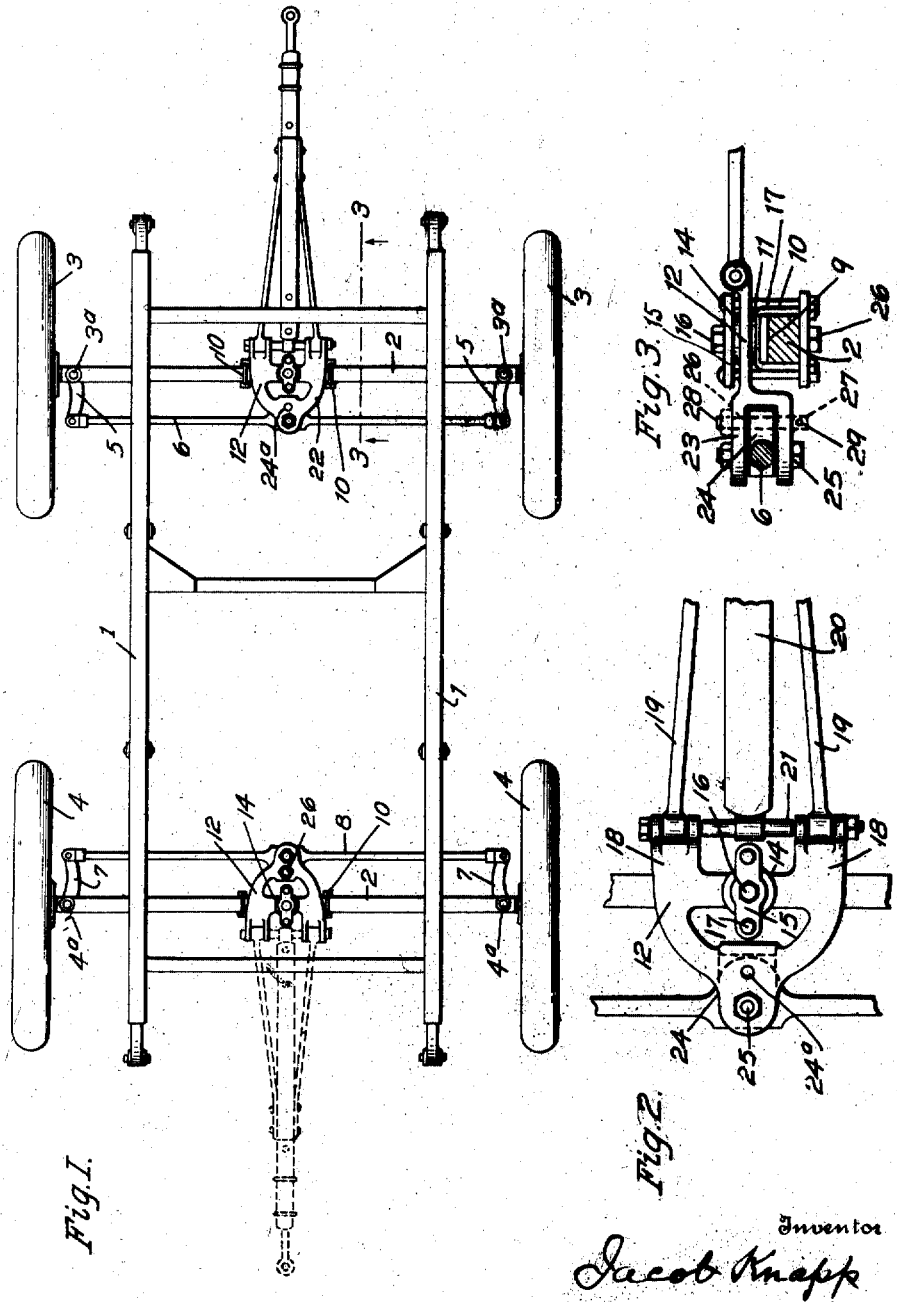

JACOB KNAPP, OF CINCINNATI, OHIO, ASSIGNOR TO THE SECHLER AND COMPANY, OF CINCINNATI, OHIO, A CORPORATION OF OHIO.

RUNNING-GEAR FOR TRAILERS.

1,252,588.     Specification of Letters Patent.     Patented Jan. 8, 1918.

Application filed April 11, 1916. Serial No. 90,359.

*To all whom it may concern:*

Be it known that I, JACOB KNAPP, a citizen of the United States, and a resident of the city of Cincinnati, in the county of Hamilton and State of Ohio, have invented certain new and useful Improvements in Running-Gears for Trailers, of which the following is a full, clear, and exact description, reference being had to the accompanying drawing, forming part of this specification.

My invention relates to trailer vehicles particularly of the type that are to be drawn by motor vehicles. In such trailers more particularly than in other vehicles of the past, there must be a strength and durability to the running gear which will be sufficient to carry and steer the vehicle over rough roads at high speeds, as compared with all draw bar pulled vehicles of the past. In various other applications for patent, particularly Serial No. 54,997, filed October 9, 1915, I have described draw bar mechanism operating on the front axle of a drawn or trailer vehicle. It is my object in this application to show, describe and claim a mechanism which is to be used for causing a drawn vehicle to move backward.

It is well known that running gear mechanism, such as described in my application above referred to and to be hereinafter noted, is not effective in both directions. That is to say, a pair of pivot axle front wheels which are steered by a draw bar mechanism pivoted on the main front axle cannot be used for steering a drawn vehicle backward. In a horse-drawn vehicle having pivot axle front wheels, it is possible to back out of a difficult place. In such cases, however, the horse can be made to move sidewise without impelling the vehicle either forward or back. Thus the horse is caused to move over to one side of the vehicle so as to turn the wheels to the proper angle and then he is backed to move the vehicle as desired.

In a vehicle drawn by another vehicle such as an automobile, there is no way of causing the motor vehicle to move sidewise to the drawn vehicle without pulling the drawn vehicle, and thus there is no way of adjusting the front wheels of the drawn vehicle to the proper position for backing without moving the drawn vehicle backward. Of course if there were in any case sufficient space for the motor vehicle to pull the drawn vehicle forwardly and to jockey into a proper position for backing, then the mechanism could be utilized, but when it is necessary to back to get out of a tight place, there is usually no room for a wide range of preparatory movements.

Accordingly it is the object of this invention to provide a mechanism which will permit of a motor vehicle drawing a trailer vehicle in either direction, by means of a simple interchange of parts, thereby accomplishing a speedy and effective means of drawing such a vehicle backward.

This object I accomplish by that certain construction and arrangement of parts to be hereinafter more specifically pointed out and claimed.

In the drawing,

Figure 1 is a top plan view of the trailer vehicle.

Fig. 2 is a detail plan view of the draw bar attachment on a larger scale.

Fig. 3 is a vertical section, taken on the line 3, 3, of Fig. 1.

The trailer vehicle has side frame pieces 1, 1, and cross axles 2, 2, one in front and one in the back. The front wheels 3, 3, and the rear wheels 4, 4, are pivoted on knuckles $3^a$, $3^a$, and $4^a$, $4^a$, respectively at the ends of the cross axles 2, 2.

Bent arms 5, 5, connect the two front wheels to the front connecting rod 6 which lies behind the front cross axle 2, and at the rear like bent arms 7, 7, connect the rear wheels with a connecting rod 8 which lies under the body of the vehicle from the rear cross axle.

Mounted on the two axles rear and front, are bearing plates 9, as shown and described fully in my former application above referred to. These plates have elliptical bearing surfaces (not shown), and are secured on the axles by means of clips 10. These plates have a central boss 11 and are so mounted as to bring the central boss at the middle of the said axles.

Mounted over the bearing plates 9 are plates 12 having a suitable recessed member for seating over a constricted central portion of the boss 11. They have also a boss 14 on the upper side, on which is placed a washer plate 15. A pivot bolt 16 passes through the plates 9 and 12 through the bosses thereof and also through the axles, it being understood that the structure is the same front and rear. A like washer plate to the plate 15 is placed beneath the axle, and extensions on each side of these plates are connected by bolts 17, thereby serving to hold the members pivotally together and serving as an additional security to the mounting of the plate 12.

Extending forwardly from the plate 12 are two arms 18, 18, which are pivotally connected to the brace rods 19, 19, on each side of the tongue 20, by means of a long pin 21. This pin likewise pivots the end of the tongue proper. The running gear as so far described is the same as in my former application, and serves the same purpose, except for the fact that there is a similar construction both at the front and rear of the vehicle, and likewise there are pivot axle wheels for each end.

Two converging arms 22 of the plates 12 extend toward the body of the vehicle from the said plates, said arms joining together at their ends in a bifurcated member 23, adapted to engage on each side of the connecting rods 6 and 8 at each end of the vehicle. The connecting rods have flattened portions 24 to enter this bifurcated member, and are pivoted therein by means of a pivot bolt 25.

As so far described, the mechanism shown will serve to draw the vehicle either forwardly or rearwardly by means of a motor or other power vehicle suitably attached to the tongue that is connected to the plate 12 by means of the long pin 21. As stated in my former application, the trailer vehicle will follow properly and closely the vehicle that is drawing it, and thus the trailer may be drawn either forwardly or rearwardly by disconnecting the long pins 21 from the tongue at the one end and coupling it to the similar construction at the other end of the trailer, and moving the motor vehicle around to said other end so as to couple it to the tongue.

The trailer thus can be pulled out of a difficult position by the simple operation of uncoupling the tongue from one end and coupling it up to the other. However it is necessary that the set of wheels which occupy the position at the rear must always be locked to the then rear axle, or the trailer could not be conveniently operated at all.

Accordingly the flattened portions 24 and the bifurcated member 23 have a second securing bolt. The member 23 and the portion 24 are pierced with a hole 24ª at the side nearest the pivot point of the bearing plate, and a securing bolt 26 is passed through said member and portion. The bolt 26 is preferably tapering and has its head 27 located beneath the member 23. The space is too constricted in the usual construction to permit of a suitable wrench being used on a nut on the under side of the member 23, and accordingly the nut 28 for this bolt is screwed onto the upper end thereof. The head may be provided with a suitable aperture 29 to receive a nail or pin to hold the bolt steady while the nut is being removed.

It is believed clear that when the bolt 26 is in place, the steering rod held by it in addition to the pivot bolt 25 will not be capable of any movement to bring the wheels out of a direct line with the body of the trailer.

Thus the operation of the new device is as follows. For ordinary driving the tongue is mounted at the front of the trailer and connected to the motor vehicle. The additional bolt 26 is mounted in its proper place in the rear, thereby locking the rear wheels in proper position. If the trailer and drawing vehicle get into a place where the trailer must be moved out backward, the long pin 21 at the front is withdrawn from engagement with the tongue members and the tongue transferred to the rear. The locking bolt 26 is withdrawn from the rear connecting rod and is inserted in the like position at the front of the trailer. The motor vehicle is brought around to the back of the trailer and coupled to the tongue and then may draw the trailer backward out of its difficult position.

By the simple mechanism now described, I am able to do away with the necessity of complicated mechanism for steering the trailer vehicle independent of the usual pulling tongue or draw bar and am able to move the trailer backward as well as forward with equal power and without any mechanism that is difficult of operation and adjustment.

I do not wish to be limited in the claims that follow to the exact structure described in the foregoing specification, as the description refers but to the preferred form of my invention; on the contrary I wish to be entitled to the full scope of the doctrine of equivalents in the construction of my claims. Also I do not wish to be limited in my claims because of my failure at this time to appreciate the full usefulness of my invention, as I intend it to be used in the future in any manner that may turn out to be economical and convenient, and that mere mechanical changes necessary to adapt it to future uses be fully included in the scope of my invention.

Having thus described my invention, what I claim as new and desire to secure by Letters Patent, is:

1. In a trailer vehicle, pivot axle wheels at both front and rear of the vehicle, a draw bar, a steering connecting rod for each set of wheels, a fifth wheel plate for each set of wheels, with pivotal connection to its respective steering rod, and means for connecting the draw bar to either of said plates, a projection on the steering rod connection with the fifth wheel, and a bolt for locking the fifth wheel plate to the steering rod of said projection for either set of wheels to hold the wheels in line with the body of the vehicle.

2. In a trailer vehicle, pivot axle wheels at both front and rear of the vehicle, a fifth wheel plate for each axle, with a king bolt therefor, connecting rods for each set of wheels, a pivot bolt for coupling the fifth wheel plate to its respective connecting rod, and a removable bolt for locking either fifth wheel plate to its connecting rod.

JACOB KNAPP.